April 18, 1939.  R. A. SANDBERG  2,155,064
AUTOMOBILE LOCKING STRUCTURE
Filed April 4, 1938  2 Sheets-Sheet 1
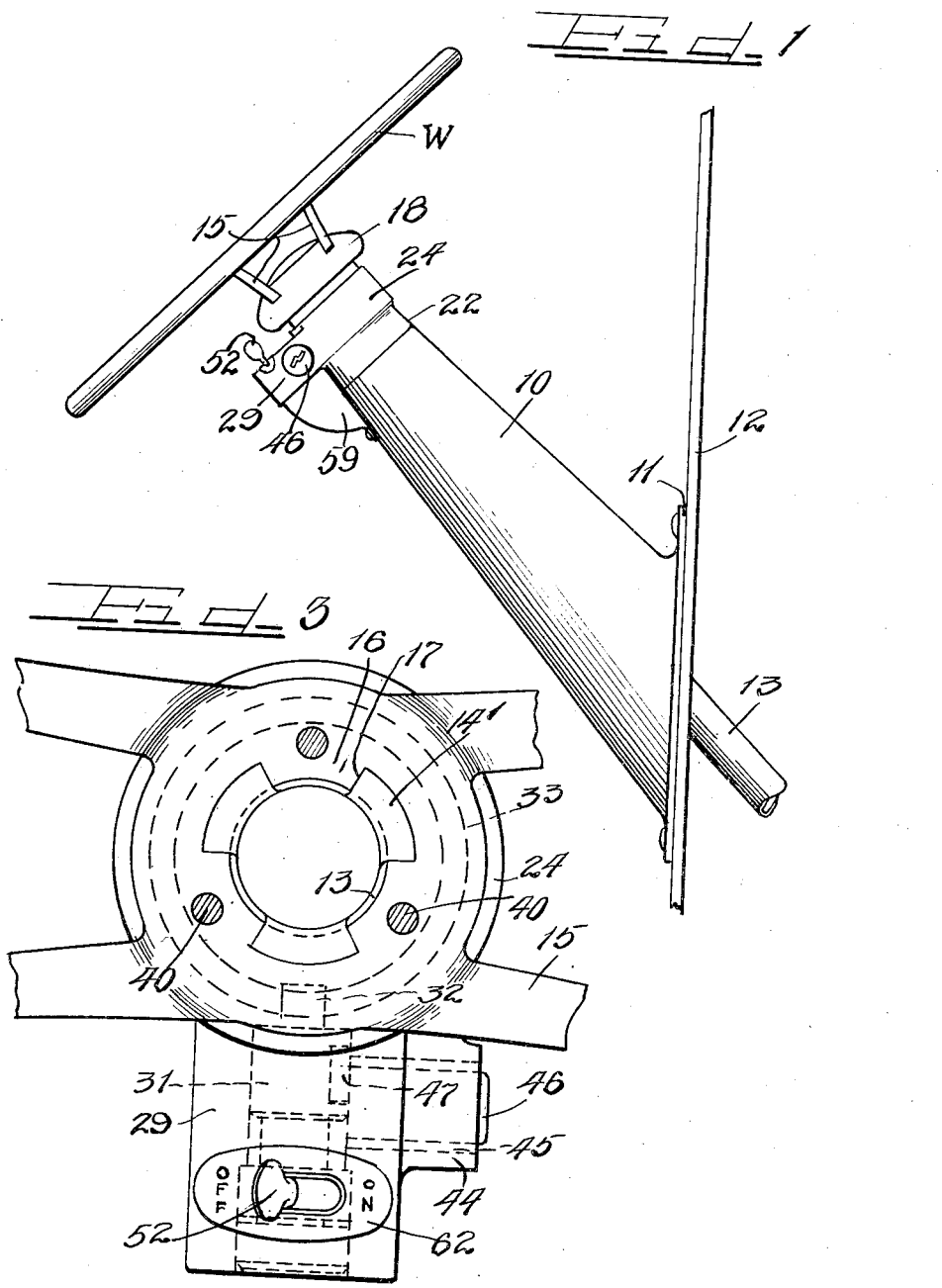
Inventor
Ray A. Sandberg.
By Charles A. Hill
Attys.

April 18, 1939.   R. A. SANDBERG   2,155,064
AUTOMOBILE LOCKING STRUCTURE
Filed April 4, 1938   2 Sheets-Sheet 2
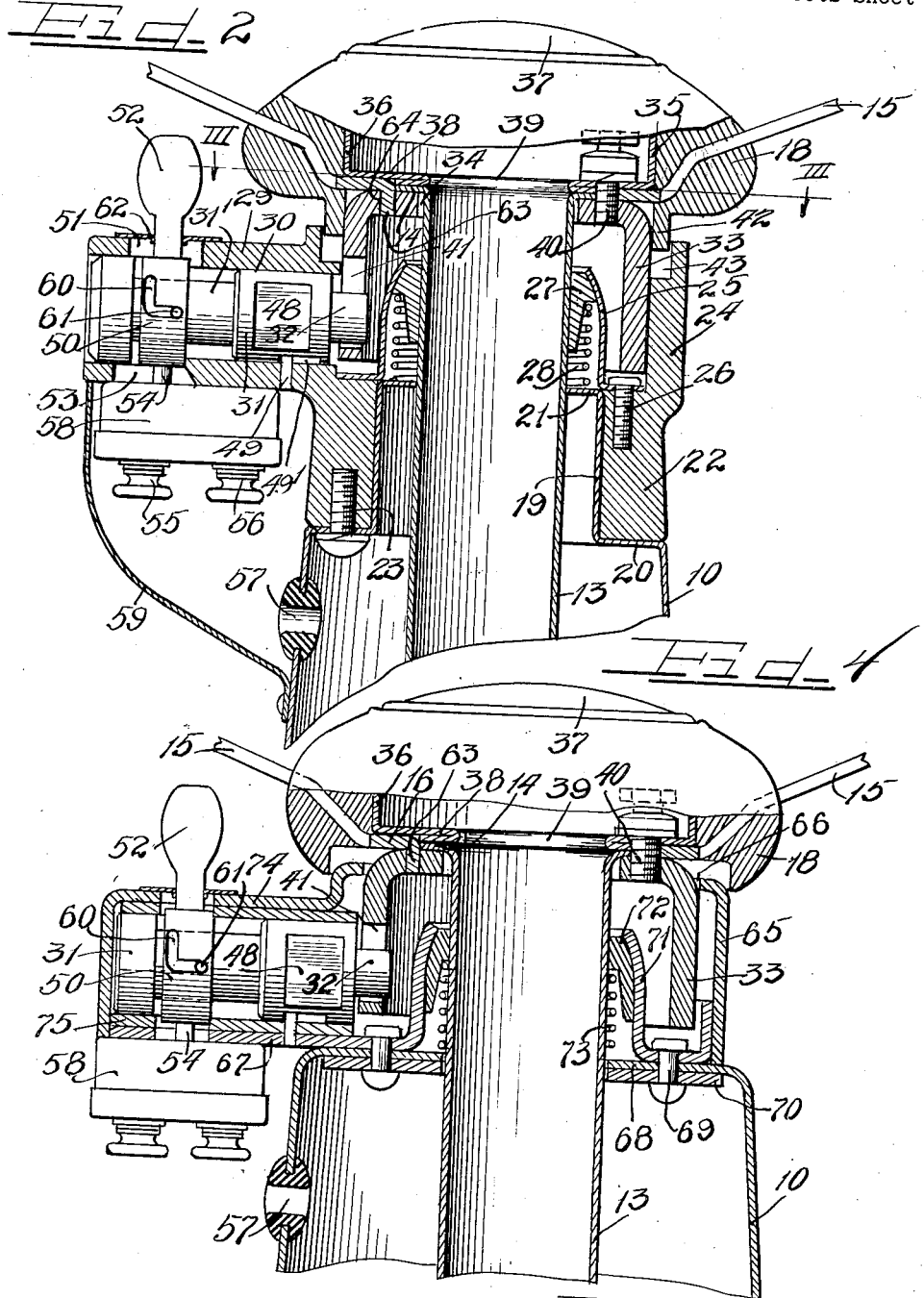
Inventor
Ray A. Sandberg Patented Apr. 18, 1939

2,155,064

UNITED STATES PATENT OFFICE 2,155,064

AUTOMOBILE LOCKING STRUCTURE

Ray A. Sandberg, Waukegan, Ill., assignor, by mesne assignments, to Houdaille-Hershey Corporation, Detroit, Mich., a corporation of Michigan Application April 4, 1938, Serial No. 199,885

2 Claims. (Cl. 70—210)

This invention relates to locking of automotive vehicles and concerns particularly an improved locking arrangement for locking the steering wheel and shaft against steering movement.

The important object of the invention is to provide a simple and efficient locking arrangement in which a lock structure is mounted on a bearing bracket for the steering shaft and provided with a locking element key operable for interlocking engagement with a keeper element secured directly to the steering wheel hub, and with the lock body concentric with and disposed directly below the wheel hub.

The various features and advantages of my invention will be apparent from the following specification and the drawings, in which drawings:

Figure 1 is a side elevation of the upper end of the steering shaft and the steering wheel and the bearing bracket therefor with the lock structure mounted thereon;

Figure 2 is an enlarged vertical diametral section;

Figure 3 is a section on plane III—III Figure 2; and

Figure 4 is a view like Figure 2 showing a modified arrangement.

Referring to Figure 1, 10 represents a bearing and supporting bracket which is hollow or of tubular form and of generally frusto conical shape, and provided with a base 11 set on the bias and adapted to be secured to a rigid support such as the instrument board or panel 12 in an automotive vehicle.

Referring to Figures 2 and 3, the steering shaft 13 may be in the form of a tube having its upper end portion deflected radially outwardly to form a flange 14 to which the steering wheel W is to be secured. The wheel rim is supported by spokes 15 extending from a hub ring 16 and preferably the hub ring and the spokes are part of an integral sheet metal stamping. In order to rigidly lock the wheel hub and steering shaft 13 together against relative rotational displacement, I have cut away a portion of the steering shaft flange 14 to leave arcuate teeth 14' for fitting into correspondingly shaped recesses 17 stamped out of the inner peripheral portion of the hub ring 16, as clearly shown in Figure 3. I have shown a hub head 18 which may be of suitable material intimately molded around the inner end of the spokes 15 and the outer peripheral portion of the hub ring 16.

The steering shaft 13 extends concentrically through the bracket 10, and the upper end of the bracket is contracted to form a cylindrical neck 19 and the annular shoulder 20, the upper end portion of the neck being deflected radially inwardly to form the annular seat 21.

Describing now the locking structure, the lock structure body 22 is annular and intimately receives the neck 19 of the bracket and rests on the shoulder 20 and may be rigidly secured in place as by screws 23, the outer face of the body aligning with the outer surface of the body of the bracket 10. Extending upwardly from the body 22 is the annular flange or wall 24 within which is a gland frame 25 which seats on the body 22 and is secured as by screws 26. The gland 25 may be formed of sheet metal and it surrounds the steering is spaced away from but surrounds the steering shaft 13, its upper end being converged inwardly to form a seat for a guide and sealing washer 27 which is held in place by a spring 28 to intimately surround the steering tube 13 and align the tube end in the bracket 10 and to serve as a seal, the washer preferably being of material such as rubber.

The flange 24 has a lateral extension 29, the body 22, the flange 24 and its extension 29 being preferably part of an integral structure such as a casting. The extension 29 has the cylindrical bore 30 for the various locking parts. The locking parts shown comprise a locking plunger 31 carrying a locking bolt 32 adapted to be projected into the space surrounded by the flange 24 of the lock frame structure. I have shown a cup-shaped keeper structure 33 whose base has the opening 34 through which the steering tube 13 extends, the base engaging against the under side of the hub ring 16 and the flange 14 on the steering tube. The hub head 18 has the cylindrical chamber or recess 34 which receives the sheet metal cup 36 which accommodates the horn controlling button 37. The bottom 38 of the cup rests against the top of the hub ring 16 and has the central opening 39 which registers with the bore of the steering tube 13. As shown the metal around the opening 39 is deflected and folded against the under side of the cup bottom 38 and rests against the flange 14 of the steering tube, as clearly shown in Figure 2. Screws 40 extend through the cup bottom 38 and the hub ring 16 and have threaded engagement in the bottom of the keeper structure 33 so that the hub ring 16 and the steering tube flange 14 are rigidly clamped between the cup bottom 38 and the bottom of the keeper, such clamping keeping the tooth sections 14' of the steering tube flange seated within the recesses 17 of the hub ring, the keeper structure 33 being thus rigidly secured to the steering wheel hub ring and the steering shaft to rotate therewith.

The cylindrical body of the keeper structure 33 is surrounded by the flange 24 of the lock structure housing and has an opening 41 therethrough for receiving the end of the lock bolt 32 on the locking plunger 31 when the plunger is shifted inwardly, the steering wheel being then securely locked against rotation.

The opening 41 is preferably located so as to be in alignment with the locking bolt when the steering wheel is in position corresponding with straight forward movement of the vehicle front wheels. The opening 41 is closed at its lower end so that when the locking bolt is therein, the steering wheel and its shaft will be locked against outward axial displacement.

The hub head 18 may have a depending annular flange 42 surrounding the keeper element 33 and extending a distance into the annular recess 43 in the upper end of the flange 24 of the lock housing.

The locking structure, besides controlling the locking of the steering as described, may also control the locking of other automobile controls, for example, the ignition circuit. The structure shown is substantially like that disclosed in Mabee Patent No. 1,917,593, issued July 11, 1933. As shown on Figures 1 and 2, the extension 29 receiving the locking parts is in axial alignment with the steering shaft and extends rearwardly, the extension on its right side having a boss 44 in which is secured the casing 45 of a cylinder lock structure, the casing journaling the tumbler cylinder 46 which at its inner end carries a cam 47 for engaging in the cross slot 48 in the locking plunger 31. Upon turning of the cylinder by the proper key, the locking plunger 31 may be shifted to steering locking or unlocking position, the locking plunger being held against rotational movement as by means of a pin or screw 49 projecting into a longitudinal groove 49′ in the locking plunger, as shown on Figure 2.

The intermediate part 31′ of the locking plunger 31 is of reduced diameter and journals a hub or ring 50. On its upper side of the extension 29 has the passageway 51 for a lever 52 extending from the hub 50, and in its lower side the extension has the opening 53 for a pin 54 extending from the hub 50 for engagement with a switch blade structure (not shown) for cooperating with terminals 55 and 56 with which a circuit, such as the ignition circuit, may connect. The circuit wires may be passed through a thimble 57 for passage through the hollow bracket 10 for connection with the battery and the ignition coil. The casing 58 containing the switch parts may be protected by a shield or housing 59 secured through the bracket 10 as shown in Figure 2.

The hub 50 of the switch lever has the L-shaped slot 60 receiving a pin 61 extending from the locking plunger, the hub 50 being held against axial movement by the escutcheon plate 62 through which the lever extends. The pin and slot forms interlock between the lever and the plunger so that the switch can be operated for closure of the ignition circuit only when the locking plunger is in its outer or steering unlocking position, and the locking plunger cannot be shifted to steering locking position until the switch lever has been moved to circuit opening position, the operation being substantially like that disclosed in the Mabee patent referred to.

In the structure described, the lock housing is directly under the steering wheel and well above the driver's knees and the lock operating key and the switch operating lever are in convenient position for manipulation by the driver. The wheel structure is directly locked against steering movement thus taking the strain off of the steering shaft in case attempt is made to force the steering wheel after it has been locked. In order to further secure the wheel to the keeper structure 33, one or more teeth 63 may be deflected from the hub ring 16 to engage in openings 64 provided in the bottom of the keeper structure as shown in Figure 2.

In the modified arrangement of Figure 4, the lock housing is shown constructed of sheet metal parts suitably formed by die operation. The lock housing body 65 is of rectangular shape and has the passageway 66 in its upper wall for receiving the keeper structure 33 which is secured to the wheel structure and to the steering shaft 13 in the same manner as shown in Figures 2 and 3.

The body 65 is closed by a bottom wall 67 secured thereto, and the housing including the body 65 and the bottom 67 rests on the upper wall 68 of the bracket 10 to be secured thereto by bolts or rivets 69, a washer 70 being preferably applied against the inner side of the bracket wall 68.

The bottom wall 67 is deflected upwardly to form the gland structure 71 for surrounding the steering tube 13 extending upwardly through the bracket, the upper end of the gland converging inwardly to form a seat for the washer 72 held by the spring 73 to snugly surround the steering tube. The body 65 has the extension 74 in which the sheet metal structure 75 provides a bore for the locking plunger structure 31 of which the locking bolt 32 may enter the opening 41 in the keeper structure 33 for locking the steering wheel, the operation of the locking structure being the same as that of the locking structure shown in Figures 1, 2 and 3.

I have thus produced simple and conveniently operable lock structure mounted directly below the steering wheel for cooperation of its locking element with a keeper structure secured directly to the steering wheel so that steering movement of the wheel may be directly locked.

I have shown practical and efficient embodiment of the features of my invention but I do not desire to be limited to the exact construction, arrangement and operation shown and described as changes and modifications may be made without departing from the scope of the invention.

I claim as follows:

1. A locking and bearing assembly for the steering wheel and the steering shaft of an automobile comprising a housing surrounding and spaced away from the shaft and terminating a distance below the steering wheel hub, said housing being deflected to provide an annular horizontally extending shoulder, an annular lock structure body seated and secured on said shoulder and extending from said shoulder up to the wheel hub, a bearing structure mounted on said lock structure body and surrounding and engaging with the steering shaft to provide a guide bearing therefor, an annular keeper structure secured to the wheel hub and extending downwardly between said bearing structure and the annular wall of the lock body structure, said keeper structure having a lock bolt receiving opening, and an extension on said lock structure body providing a bore, and a lock bolt shiftable in said bore for engagement in said keeper structure opening for locking said keeper structure and thereby said wheel and shaft against steering movement.

2. A locking and bearing assembly for the steering wheel and steering shaft of an automobile comprising a housing spaced from and surrounding said shaft and terminating a distance below the hub of the steering wheel, said housing being deflected inwardly to provide an annular horizontal shoulder, an annular wall seated and secured on said shoulder and extending upwardly to the hub of the steering wheel, a bearing frame secured on said annular wall to surround said shaft and bearing element within said bearing frame engaging with said shaft to form a bearing guide therefor, an inverted cup shaped keeper structure secured at its bottom to the wheel hub and extending downwardly between said bearing frame and said annular wall and being provided with a lock bolt receiving opening, a lateral extension on said annular wall providing a bore, and a lock bolt shiftable in said bore for engagement with the keeper structure opening whereby to lock said wheel and shaft against steering movement.

RAY A. SANDBERG.